(12) United States Patent
Chang

(10) Patent No.: US 6,968,075 B1
(45) Date of Patent: Nov. 22, 2005

(54) SYSTEM AND METHOD FOR THREE-DIMENSIONAL SHAPE AND SIZE MEASUREMENT

(76) Inventor: Kurt C. Chang, 1562 Third Ave., #3C, New York, NY (US) 10128

( * ) Notice: Subject to any disclaimer, the term of this patent is extended or adjusted under 35 U.S.C. 154(b) by 749 days.

(21) Appl. No.: 09/852,446

(22) Filed: May 9, 2001

Related U.S. Application Data

(60) Provisional application No. 60/202,811, filed on May 9, 2000.

(51) Int. Cl.[7] ............... G06K 9/00; G06F 19/00
(52) U.S. Cl. .............. 382/111; 700/132; 706/919; 382/154
(58) Field of Search ............ 382/111, 154, 128; 345/418, 419, 964, 966; 700/182, 919, 130–132

(56) References Cited

U.S. PATENT DOCUMENTS

| | | | |
|---|---|---|---|
| 4,539,585 A | | 9/1985 | Spackova et al. |
| 4,885,844 A | | 12/1989 | Chun |
| 5,452,407 A | * | 9/1995 | Crook ............ 345/421 |
| 5,495,568 A | | 2/1996 | Beavin |
| 5,515,268 A | | 5/1996 | Yoda |
| 5,530,652 A | * | 6/1996 | Croyle et al. ........ 700/130 |
| 5,551,021 A | | 8/1996 | Harada et al. |
| 5,615,318 A | | 3/1997 | Matsuura |
| 5,680,528 A | | 10/1997 | Korszun |
| 5,724,522 A | | 3/1998 | Kagami et al. |
| 5,768,135 A | | 6/1998 | Park et al. |
| 5,778,177 A | * | 7/1998 | Azar .................... 709/202 |
| 5,850,222 A | | 12/1998 | Cone |
| 5,930,769 A | | 7/1999 | Rose |
| 5,966,310 A | * | 10/1999 | Maeda et al. ........ 707/104.1 |
| 6,246,468 B1 | * | 6/2001 | Dimsdale .............. 356/4.02 |
| 6,553,138 B2 | * | 4/2003 | Rozin .................... 382/154 |
| 6,687,392 B1 | * | 2/2004 | Touzawa et al. ....... 382/128 |

OTHER PUBLICATIONS

Jojic, et al., "Computer Modeling, Analysis, and Synthesis of Dressed Humans," IEEE. 1998/1999, pp. 1-3/378-388.*

* cited by examiner

Primary Examiner—Bhavesh M. Mehta
Assistant Examiner—Shefali Patel
(74) Attorney, Agent, or Firm—O'Connell Law Firm

(57) ABSTRACT

A method for three-dimensional shape and size measurement of a three-dimensional body surface comprising providing a three-dimensional scanner, providing a processor, providing a three-dimensional Computer Aided Design system, scanning in three dimensions with the three-dimensional scanner at least a portion of the three-dimensional body surface, creating a data file representative of the three-dimensional body surface, processing the data file with the processor, importing the data file into the three-dimensional Computer Aided Design System, employing the three-dimensional Computer Aided Design System relative to the data file to define and record three-dimensional measuring data relative to at least a portion of the three-dimensional body surface, A and employing the three-dimensional Computer Aided Design System to exploit the three-dimensional measuring data.

22 Claims, 13 Drawing Sheets

| 3D Body Shape/Sizing System Measurement Specifications | Style Allowance | Your Size | Fit Check |
|---|---|---|---|
| Neck | | | |
| Traditional Size: | 15"-15 ½" | 15" | ✓ |
| Fit Zone data Available | 3 ¾"-4" | 4" | ✓ |
| | 4 ½"-4 ¾" | 4 ½" | ✓ |
| Shoulder | | | |
| Traditional Shoulder Size: | 17"-18" | 17" | ✓ |
| Shoulder pt to pt Distance: | 16"-17 ½" | 16 | ✓ |
| Fit Zone data Available | ✓ | ✓ | ✓ |
| Sleeve | | | |
| Traditional sleeve length: | 34"-36" | 34" | ✓ |
| Fit Zone data Available | ✓ | ✓ | ✓ |
| Bust/Chest | | | |
| Traditional Bust/Chest Size: | 38"-40" | 40" | ✓ |
| Fit Zone data Available | ✓ | ✓ | ✓ |
| Waist | | | |
| Traditional Waist Size: | 32"-34" | 34" | ✓ |
| Fit Zone data Available: | ✓ | ✓ | ✓ |
| Hip | | | |
| Traditional Hip Size: | 37"-39" | 37 ½" | ✓ |
| Fit Zone data Available | ✓ | ✓ | ✓ |
| Mid Thigh | | | |
| Traditional Mid Thigh Size: | Up to 23" | 21" | ✓ |
| Fit Zone data Available. | ✓ | ✓ | ✓ |
| Neck to Chest at Armscye Distance: | 3"- 3 ½" | 3 ¼" | ✓ |
| Chest at Armscye to Bust plane Distance | 2"-2 ½" | 2" | ✓ |
| Bust/Chest to Waist plane Distance: | 10"-10 ½" | 10" | ✓ |
| Waist to Hip plane Distance: | 4"-5 ½" | 5" | ✓ |
| Hip to Lowest Crotch Point Distance. | 3"-3 ¾" | 3" | ✓ |
| Lowest Crotch Point to Mid Thigh plane Distance: | 4"-6" | 5" | ✓ |
| Mid Thigh plane to Floor plane Distance: | 26"-26 ½" | 26" | ✓ |

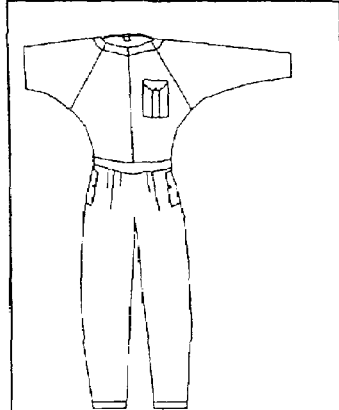

Designer: J.J Miller
Style: Jumper 200456
Size: 18 M
Fiber Content: 100% Cotton
In Stock: Yes Garment Fit Report:
According to our calculations size 18 M in this style will fit you shape Loose Fitting Style Other Comments.
We are sorry, we do not have the following color(s):
- Sky Blue.

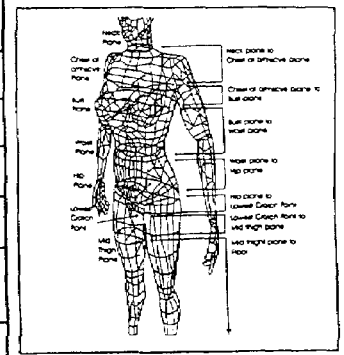

FIG. 5

USA SHORT HEIGHT GROUP – AVERAGE BUST

| Ref | Measurement | 8S | 10S | 12S | 14S | 16S | 18S |
|---|---|---|---|---|---|---|---|
| 1 | Bust girth | 78.7 | 82.6 | 86.4 | 90.2 | 95.3 | 100.3 |
| 2 | Waist | 58.4 | 61.0 | 64.8 | 68.6 | 73.7 | 78.7 |
| 3 | Hip girth | 82.6 | 86.4 | 91.4 | 96.4 | 101.4 | 106.4 |
| 12 | Neck base girth | 35.9 | 36.5 | 37.2 | 37.8 | 38.7 | 39.7 |
| 13 | Upper arm (muscle) | 23.2 | 24.8 | 26.3 | 27.9 | 29.8 | 31.8 |
| 24 | Height | 151.1 | 152.4 | 153.7 | 154.9 | 156.2 | 157.5 |
| 25 | Cervical height | 128.3 | 129.5 | 130.8 | 132.1 | 133.6 | 134.6 |
| 29 | Knee height | 40.6 | 41.0 | 41.3 | 41.6 | 41.9 | 42.2 |
| 31 | Outside leg | 93.0 | 94.0 | 94.9 | 95.9 | 96.8 | 97.8 |
| 35 | Back waist length | 35.9 | 36.2 | 36.8 | 39.2 | 37.8 | 38.1 |
| 36 | Across back | 29.8 | 30.8 | 31.7 | 32.7 | 34.0 | 35.2 |
| 39 | Shoulder length | 10.5 | 1.8 | 10.8 | 11.1 | 11.1 | 11.4 |
| 49 | Cervical to center front waist | 46.4 | 47.0 | 47.6 | 48.3 | 49.2 | 50.2 |
| — | Weight, kg. | 42.7 | 46.4 | 50.9 | 56.4 | 62.7 | 69.1 |

USA REGULAR HEIGHT GROUP – AVERAGE BUST

| Ref | Measurement | 30 R | 32R | 34R | 36R | 38R | 40R | 42R |
|---|---|---|---|---|---|---|---|---|
| 1 | Bust girth | 83.8 | 85.8 | 90.8 | 95.8 | 100.8 | 105.8 | 110.8 |
| 2 | Waist girth | 63.5 | 68.5 | 73.5 | 78.5 | 85.1 | 91.4 | 97.8 |
| 3 | Hip girth | 86.4 | 91.4 | 96.4 | 101.4 | 106.4 | 111.4 | 116.4 |
| 12 | Neck base girth | 36.8 | 37.5 | 38.1 | 38.7 | 39.7 | 40.6 | 41.6 |
| 13 | Upper arm (muscle) | 25.1 | 27.0 | 28.9 | 30.8 | 32.7 | 34.6 | 36.5 |
| 24 | Height | 161.3 | 162.6 | 163.8 | 165.1 | 166.4 | 167.6 | 168.9 |
| 25 | Cervical height | 38.4 | 139.7 | 141.0 | 142.2 | 143.5 | 144.8 | 146.0 |
| 29 | Knee height | 43.5 | 43.8 | 44.1 | 44.4 | 44.8 | 45.1 | 45.4 |
| 31 | Outside leg | 100.6 | 101.6 | 102.5 | 103.5 | 104.4 | 105.4 | 106.3 |
| 35 | Back waist length | 39.4 | 39.7 | 40.0 | 40.3 | 40.7 | 41.0 | 41.3 |
| 36 | Across back | 31.1 | 32.4 | 33.7 | 34.9 | 36.2 | 37.5 | 38.7 |
| 39 | Shoulder length | 11.1 | 11.1 | 11.4 | 11.4 | 11.8 | 11.8 | 12.1 |
| 49 | Cervical to center front waist | 48.9 | 49.5 | 50.2 | 50.8 | 51.8 | 52.1 | 53.7 |
| | Weight: kg | 50.9 | 56.4 | 61.8 | 69.1 | 76.4 | 83.6 | 90.9 |

USA TALL HEIGHT GROUP – AVERAGE BUST

| Ref | Measurement | 10 T | 12 T | 14 T | 16 T | 18 T | 20 T |
|---|---|---|---|---|---|---|---|
| 1 | Bust girth | 82.6 | 86.4 | 90.1 | 94.0 | 97.8 | 101.6 |
| 2 | Waist girth | 61.0 | 64.8 | 68.6 | 72.4 | 76.2 | 80.0 |
| 3 | Hip girth | 87.6 | 91.4 | 96.4 | 101.4 | 406.4 | 111.4 |
| 12 | Neck base girth | 37.1 | 37.8 | 38.4 | 39.1 | 39.7 | 40.3 |
| 13 | Upper arm (muscle) | 24.1 | 25.7 | 27.3 | 28.9 | 30.5 | 32.1 |
| 24 | Height | 171.5 | 172.7 | 174.0 | 175.3 | 176.5 | 177.8 |
| 25 | Cervical height | 148.6 | 149.9 | 151.1 | 152.4 | 153.7 | 154.9 |
| 29 | Knee height | 47.6 | 47.9 | 48.2 | 48.5 | 48.8 | 49.1 |
| 31 | Outside leg | 115.6 | 116.8 | 118.1 | 119.4 | 120.7 | 121.9 |
| 35 | Back waist length | 41.0 | 41.6 | 41.9 | 42.6 | 42.9 | 43.5 |
| 36 | Across back | 31.4 | 32.3 | 33.3 | 34.3 | 35.1 | 36.2 |
| 39 | Shoulder length | 11.4 | 11.4 | 11.8 | 11.8 | 12.1 | 12.1 |
| 49 | Cervical to center front waist | 50.5 | 51.1 | 51.8 | 52.4 | 53.0 | 53.6 |
| — | Weight: kg | 51.8 | 57.3 | 62.7 | 69.1 | 75.5 | 81.8 |

Measurements in centimeters / Reference #'s see FIG. 3 / US Dept. of Commerce Data

FIG. 6

SYSTEM AND METHOD FOR THREE-DIMENSIONAL SHAPE AND SIZE MEASUREMENT

This application claims the benefit of U.S. Provisional Application No.: 60/202,811 filing date May 9, 2000

FIELD OF THE INVENTION

The present invention relates generally to the field of measuring systems. More particularly, this patent discloses and protects a system and method for supplementing bodily size measurements with three-dimensional (3D) shape definition to define accurately the 3D shape and dimensions of girths, arc curves, and certain widths and lengths of bodily surfaces. The system employs the ascertained 3D data to carry out a plurality of functions including the automatic generation of 3D garment patterns, the accurate prediction of sizes, and the virtual trying on of garments.

BACKGROUND OF THE INVENTION

Traditional garment sizing systems have relied on tailor measurements taken manually from an individual's bodily surfaces. These measurements are then compared with a predefined sizing chart to find the closest size match from a set of standard sizes. With this, a 'size number' can be assigned to the individual.

As one skilled in the art will be aware, the total number of sizes in a given size range can vary depending on the garment type and style. One will appreciate that the number of sizes in a given range will increase as the fit requirement increases. For example, the garment fit requirement differences between a pair of loose fitting warm-up sweat pants and a pair of tight fitting jeans exemplify how close fitting styles require more sizes in their size ranges loose fitting styles.

In the last few decades, the apparel industry has adopted a subset of measurements extracted from a larger set of governmentally sponsored body survey measurements. This larger data set has been, and still is, commonly used in anthropometrical research surveys. FIG. 3 provides an example of measurements taken in such surveys. These surveys were conducted by agencies in different countries to provide useful human body data for use by automotive, marine, aerospace, apparel, furniture, and other industries.

The common measurements taken by most major surveys can be categorized in the groupings set forth below.

Girths: Circumference measurements taken around the person's torso or limbs.

Arcs: Measurements that are specific parts or segments of girth measurements. Arcs are linear lengths that do not define the shape of the arc curve accurately. Instead, prior art measuring methods automatically assume that the curve is oval or ellipse shaped. The arcs indicated at 21 and 22 in FIG. 3 are good examples.

Verticals: Measurements of straight linear height distances, typically between a floor surface and various girth lines.

Widths and Lengths: Linear measurements between landmarks and extreme points of a bodily surface.

As FIG. 6 shows, the garment and apparel industries have created their own sizing systems by taking selective measurements from the larger governmental body survey data set and creating sizing measurement charts. These sizing measurement charts are organized in a table format. The first column of the table lists a set of measurement descriptions (i.e., waist, chest, neck, etc.). Across the top of the table, a sequence of sizes in a particular size range is listed representing the heading of each size column (i.e., small, medium, large, or size numbers, etc.). A standardized value is set forth beneath each designated size heading and column and parallel to each row of measuring descriptions. These standardized values were derived from reports published by various anthropometrical research surveys, and they were further refined using experiences gained from working with customers. As one will appreciate, the sizing values and measuring descriptions sometimes vary between different designers and manufacturers and often depend on their target customer demographics.

One knowledgeable in the art will be aware that commonly used bodily surface measuring methods can be performed manually or with the assistance of mechanical or digital devices. The most common and widely used manual method is carried out with a tailor's measuring tape. In doing so, the person to be measured is asked to stand or sit still while the measurements are taken. Linear distances between landmarks on the body surface are measured and recorded as are torso and limb circumferences.

Mechanical and digital measuring devices include stadiometers, anthropometers, and full body scanners. By way of background, one will note that a full body scanner is commonly defined as any device that is capable of capturing body surface data and representing the captured data in a digital format. This format can, for example, comprise points in an XYZ coordinating system, polygonal mesh, non-uniform rational b-spline surfaces, or wire-frames, all of which can be used in a 3D computer system.

One persistent problem with current sizing systems is that they are founded on the same measurement principles and parameters that were developed by anthropometrical research scientists using body-sizing surveys. It was, and still is, assumed that the measurements gathered using such a methodology offer sufficient body shape data for use by apparel manufacturers. Those that did not completely agree with the assumptions inherent in using survey information were compelled to invent special methods and systems to translate their special measuring data for configuring specially built apparatuses for designing and making garments.

Unfortunately, current measuring systems have typically assumed, incorrectly, that girth circumference measurements are geometrically elliptical shapes and that the measuring path between landmarks are either straight lines or ovally-shaped curves. These assumptions were necessarily made as a result of limitations in the types of measuring devices available and the shear difficulties involved working with irregular organic shapes. Because of these assumptions, the shapes of girth and arc and some width and length measurements often are poorly or incorrectly defined.

One may look, for example, to the tailor 'Hip' measurement. The traditional tailor measuring method offers a single measuring unit describing the perimeter of the body surface at the hip line. However, this single measuring unit does not describe the shape of the hip girth. Consequentially, the same hip measurement unit could be used in describing an 'oval' shaped hip or a 'semi-circle' shaped hip. A pair of pants designed to fit a body with an oval-shaped hip will not properly fit a person with a body having a semi-circular shaped hip. In reality, the cross sectional view of the hip demonstrates the hip does not resemble an ellipse shape. This difference in shape details determines the difference in fit of the garment.

Among the unfortunate results of such inaccurate shape descriptions in current sizing systems is that consumers are reluctant to shop through catalogs and via the Internet. Because current systems force consumers to use traditional size systems when making an order, most catalog retailers inevitably lose the business of those customers who are not willing to take a chance that the ordered clothing will fit properly. Furthermore, even when customers are willing to order clothing under such systems, retailers commonly face high percentages of returns as a result of what is considered to be a poorly fitting garment.

As one would expect, many developers of apparel business applications have attempted and continue to attempt to solve these problems. For example, the following approaches have been disclosed:

Level I: The system displays a 2.5-dimensional (2.5D) virtual model, which is limited to front, side, and back views of a model at eye level, on the retailer's web site that closely resembles the body of the consumer. The 2.5D virtual model is built based on surface measurement information provided by the consumer. With this, various garment styles can be selected and placed on the virtual model, and consumers can see what the garment may look like on that type of body. Disadvantageously, this approach allows visualization only and cannot be used to determine actual fit.

Level II: The system displays a 2.5D or 3D virtual model on the web site that closely resembles the body of the consumer. In the 3D virtual model, there are substantially no limitations on how the model can be rotated, viewed, zoomed in or out, rotated throughout 360 degrees about vertical and horizontal axes, or otherwise manipulated. The 3D virtual model is built based on traditional measurement information without the benefit of 3D shape data provided by the customer. Then, the measurements are checked with a sizing database to determine the best-fitting size. A list can be generated of various manufacturer and designer names that have matching sizes. The customer will then have the option of selecting from that list and virtually trying on and visually inspecting garments on the virtual model in 2.5D or 3D. However, as a result of the lack of body shape data descriptions in current sizing systems, the accuracy of the size prediction performed using this method is highly questionable.

Level III: A level III system displays a 3D model of the consumer's virtual body and allows the consumer to select any garment style or size and to try it on the virtual body thereby allowing the consumer to check the appearance and fit visually. If the consumer is satisfied with the stationary look of the garment, then the virtual body can be animated to see how the garment's fabric fits and moves during walking, running, bending, and other activities. Unfortunately, such systems cannot be implemented without proper 3D reference matching points for both the virtual garment and the virtual body.

One knowledgeable in the art will appreciate that there are at least three challenges that one must commonly confront with each of the above approaches. First, the visual inspection of how garment styles display on a virtual body inside a computer monitor is an insufficient means for determining fit. For example, some fit requirements simply cannot be seen. Fit is a subjective decision made by a consumer based on how the interior structure of the garment interacts with the person's real body surface. Also, some fit characteristics can be felt only through sensations detected during body movements.

Secondly, some body configurations are not considered optimally shaped to display certain garment styles. The contrast can be exaggerated when the consumer makes comparisons between the optimal display provided by viewing the style on a model in comparison with how the garment looks on his or her actual body. As a result, this approach runs the risk of losing sales and upsetting customers.

Furthermore, apparel retailers naturally seek to display garments in, for example, fashion photographs in fashion magazines and the like in a way that is most appealing and that compliments the consumer's apparel shopping psychology. Garment styling along with subtle environmental themes and facial and body expressions of the models convey very powerful marketing messages to the consumer. Through repetition, many consumers subconsciously associate these subtle but powerful messages with the garments themselves, and the repeated subliminal suggestions alone are enough to make the sale. Most consumers also have a tendency to see themselves selectively in a 2D mirror view. With 3D technology, some consumers can quickly adjust to and feel comfortable seeing themselves in 3D while others may not be prepared to view themselves in such a way. With this, potential sales can be lost when consumers find true 3D views of themselves unappealing.

Advantageously, the present inventor has appreciated the continued need for a system capable of showing the fit of a garment without necessarily displaying the garment on a body or virtual model. The inventor has further appreciated the need for an accurate method for calculating how a selected garment style and size will fit each consumer's unique body shape.

Current 3D CAD systems use adjustable 3D virtual models, but they do not offer accurate shape adjustment features because the system developers have assumed that traditional body measuring methods gather sufficient data to describe body shapes. This lack of available shape control data results in unrealistic virtual try on simulations thereby making it impossible to calculate correct sizing. 3D garments designed from unrealistic virtual models naturally tend to result in poor fitting garment patterns.

In light of the above-described state of the art, one will appreciate that a system providing for accurate 3D shape and size measurement would be useful, and it is still more clear that a system providing still further advantages over the prior art would represent a marked advance.

SUMMARY OF THE INVENTION

Advantageously, the present invention is founded on the fundamental object of providing a system for the accurate measurement of 3D shapes and sizes by providing the additional data needed to describe 3D shapes accurately and completely.

An underlying object of the invention is to provide a system for enabling the measurement of 3D shapes and sizes that, when used in conjunction with traditional body surface linear and circumference measurements, instills more consumer confidence and trust in the results of garment size and fit predictions.

Another primary object of the invention is to provide an improved system and method that can accurately describe the actual shapes of body curves and girth measurements. The achievement of that object is particularly advantageous when one again appreciates that existing sizing measuring methodologies can not provide accurate shape data for girth and arc and some width and length measurements taken on the surface of the body.

A further object of the invention is to create additional body shape data for use by any existing or future 3D Computer Aided Design (CAD)/Computer Aided Manufacturing (CAM) systems as shape adjustment parameters to create more accurate representations of human bodies.

Yet another object of the invention is to present 3D shape definition points for use as matching reference points in 3D CAD systems thereby to make possible the creation of intelligent garments and to enable automatic custom garment pattern making. As a result, 3D CAD systems using relational geometry technology will enable users to create garment patterns in 3D digital space and to define relationships between the garment and the body surface. With that relationship and sub-relationships between garment patterns established, the intelligent garment will be able to morph all linked patterns automatically and it will be able to adjust existing shapes and dimensions to any new 3D body surfaces while simultaneously maintaining the pre-defined geometric relationship between the body surface and garment patterns. Still further, newly shaped 3D garments can be deconstructed into individual pattern pieces, unwrapped, flattened into 2D pattern pieces, and sent to an automatic fabric cutter. This feature of the invention can be expected to play an essential role in the apparel mass customization process.

A still further object of the invention is to use 3D shape data in 3D relational geometry CAD systems. Systems using this shape data can improve upon traditional apparel industry pattern 'grading' methods. Traditional methods create size ranges assuming standard tailor measurements are different between sizes but that the body shapes are similar. This 'grading' method cannot be used to generate an 'expanded' size range that will include many different body shape types. Using the present invention's approach, garments will need to be created only once on an adjustable virtual mannequin. As new shape parameters are entered to redefine the shape of the mannequin, the garment patterns will also automatically adjust. New garment patterns can now be made automatically and generated for each different body type.

A further object of the invention is to enable garment manufactures to use the 3D shape data in a central database so that individual consumer's 3D shape size data can be accurately compared with the central database to determine whether a given garment can fit properly.

An even further object of the invention is to allow garments designed in 3D using 3D relational geometry technology and 3D girth and curve shape definition points to be downloaded from an internet web site. With this, assuming both entities have compatible matching references, consumers can virtually try on 3D virtual garments on the digital body stored on, for example, a local computer system or a memory disk. Additional software functions, such as fabric draping simulations combined with body movement animations, can be executed to see how the garment will move with the body.

These and further objects and advantages of the present invention will be obvious not only to one skilled in the art who has reviewed the present specification and the accompanying drawing figures but also to one who has an opportunity to take advantage of an embodiment of the invention.

In carrying forth these and further objects, the present invention for a system and method for three-dimensional shape and size measurement creates and provides additional body surface data including 3D girth and curve shape definition points to provide truly accurate body shape description. This data can be applied by substantially any system to configure accurately shaped virtual mannequins. Alternatively, the system and method can be used in a database designed to calculate the fit of garments for any given body. Still further, the system and method can be used as reference matching controls entities by 2D and 3D automatic custom pattern making systems.

One will again appreciate that, prior to technological breakthroughs in the ability to capture full body surface data, traditional sizing systems were limited by available measuring tools and by the physical accessibility to certain measuring 'landmarks.' Further restrictions include practical limitations in the time and skill required for calculating and recording the shape data in curves and for determining the relationships between them. Still further limitations derive from the physical and mental endurance of the person being measured.

Advantageously, recent developments in 3D CAD software packages allow the present invention to overcome these traditional and practical limitations by using 3D CAD software and by working with full body surface data captured by full body scanners. Under this arrangement, the 3D CAD operator is able to add 3D points and lines, to take any body measurements, and to create planes slicing though the body torso or limbs at any angle. These new capabilities, never available before, can be used to define more accurate body measurements.

The present invention utilizes these new capabilities to, among other things, create 3D shape definition points on girth and curve measurements to define circumferential shapes and to propose a more accurate methodology for designing garment patterns in 3D. The added shape data is used to configure accurate 3D digital mannequins. It is also used as matching reference by 3D CAD systems to generate automatic custom-made garment patterns. The same data is further utilized for matching references that are needed to fit virtual 3D garments to digital mannequins or virtual bodies. Still another use for this data set is by databases for providing accurate sizing predictions. The 3D shape definition points can be added to any existing sizing measurements. These include, but are not limited to, traditional tailor sizing measurements and anthropometrical body size survey measurements.

Of course, one should be mindful that the foregoing discussion broadly outlines the more important features of the invention to enable a better understanding of the detailed description that follows and to instill a better appreciation of the inventor's contribution to the art. Before an embodiment of the invention is explained in detail, it must be made clear that the following details of construction, descriptions of geometry, and illustrations of inventive concepts are mere examples of the many possible manifestations of the invention.

BRIEF DESCRIPTION OF THE DRAWINGS

In the accompanying drawing figures:

FIG. 5 is an exemplary basic garment fit report generated for a garment styled to be loose fitting;

FIG. 6 is a chart depicting exemplary traditional sizing charts;

DETAILED DESCRIPTION OF PREFERRED EMBODIMENTS

Figure 1:
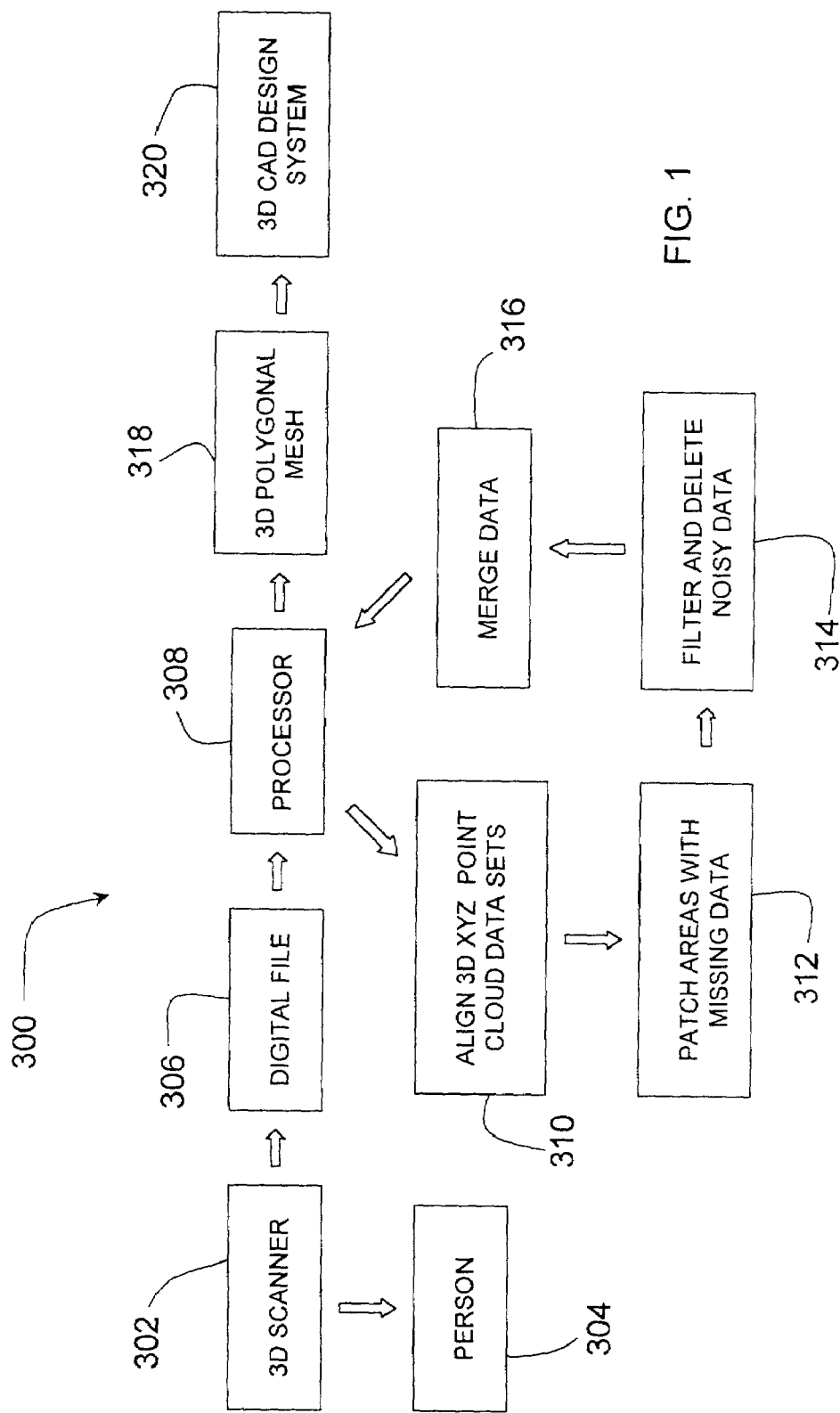
FIG. 1 is a schematic view of an embodiment of the present invention for a system for three-dimensional shape and size measurement.

As is the case with many inventions, the present invention for a system and method for three-dimensional shape and size measurement is subject to a wide variety of embodiments. However, to ensure that one skilled in the art will be able to understand and, in appropriate cases, practice the present invention, certain preferred embodiments of the broader invention revealed herein are described below and shown in the accompanying drawing figures.

As one will appreciate from reviewing this disclosure, the present invention can make 3D full body scanning technology readily accessible to consumers in numerous locations including, by way of example, their local shopping areas. Looking more particularly to the drawings, an overview of an embodiment of the present system for three-dimensional shape and size measurement is indicated at 300 in FIG. 1. There, one sees that by use of a 3D full body scanner 302, a person 304 can be scanned in, for example, his or her undergarments and footwear that the person 304 may intend to wear with the garment sought to be created. Scans of different poses may be required depending on the type of measurements to be acquired. Prior to activating the scanner 302, the person 304 typically will be required to take a breath through his or her nose with closed lips. The person 304 then will hold his or her breath for the duration of the 3D scanning process. One skilled in the art will be aware that a number of companies manufacture full body scanners including Cyberware USA, Hamamashi Japan, Textile and Clothing Technology Center USA, TecMath Germany, Wicks and Wilson Limited UK.

Although one skilled in the art certainly would be able to practice this aspect of the invention based on the present discussion, the following patent disclosures, which are expressly incorporated herein by reference, may provide useful background information to the reader: U.S. Pat. No. 5,852,672 to Lu for an "Imaging System for Three Dimensional, 360 DEGREE, Time Sequence Surface Mapping of Moving Objects"; U.S. Pat. No. 6,049,625 to Sakamoto for a "Method of and an Apparatus for Three-Dimensional Structure Estimation"; U.S. Pat. No. 5,561,526 to Huber et al. for a "Three Dimensional Measurement Device and System"; U.S. Pat. No. 5,778,177 to Azar for an "Interactive Scanning Device or System"; U.S. Pat. No. 5,964,707 to Fenster et al. for a "Three-Dimensional Imaging System"; U.S. Pat. No. 5,901,708 to Chang et al. for a "Method and Apparatus for Forming Ultrasonic Three-Dimensional Images Using Cross Array"; U.S. Pat. No. 5,797,845 to Barabash et al. for an "Ultrasound Apparatus for Three Dimensional Image Reconstruction"; and U.S. Pat. No. 5,864,640 to Miramonti et al. for a "Method and Apparatus for Optically Scanning Three Dimensional Objects Using Color Information in Trackable Paths".

In any event, after the person 304 has been scanned, the full body scanner 302 will generate a digital file 306. Depending on the scanner 302, various levels of additional data processing by a processor 308 may be required. This processing includes the alignment of various captured 3D XYZ point cloud data sets as shown at 310, the patching of areas with missing data as shown at 312, and the filtering and deleting of noisy data as shown at 314. After the data of the digital file 306 has been processed, it is then merged as shown at 316 to create a polygonal mesh 318 of the full body surface in a standard digital file format. Currently, some of the most widely accepted file formats are .obj, .stl, .vrml, and others. The polygonal mesh 318, which represents the 3D body surface data, will be imported into a 3D Computer Aided Design (CAD) system 320 and employed to design and, possibly, to make virtual and actual garments as will be discussed more fully hereinbelow.

One skilled in the art will be aware that many scanner manufacturers have developed proprietary Automatic Body Measurement Extraction software following traditional measuring principles. One presently preferred 3D CAD software for use in taking 3D measurements on polygonal surfaces is called 'PolyWorks' and is distributed by a company called InnovMETRIC Software Inc. in Canada. Presently preferred 3D CAD software for use in working with 3D XYZ point cloud data is called 'geomagicStudio', which is distributed by a company called Raindrop GEOMAGIC Inc. in the United States. One of the most powerful 3D CAD design software systems with relational geometry technology capabilities for working on complex organic surfaces is called 'MultiSurf' and is designed and written for the marine industry by a software company called AeroHydro, which is located in Maine, USA. 'MultiPlex' is an add-on module to flatten 3D shapes to 2D patterns. Since they are widely used, it is clear that one knowledgeable in the present art will be well aware of the use and structure of the aforementioned and similar software systems.

The tasks and processes involved in deploying the shape measurement principles under the present invention can be grouped into four categories:

Type 1: Identifying the data to be measured (traditional body survey and tailor measurements could be used as basic guidelines).

Type 2: Defining methods to record and organize the data in a meaningful and logical format so it can be easily understood.

Type 3: Analyzing and comparing data to obtain meaningful results, such as size prediction.

Type 4: Utilizing data, as in reverse engineering the body shape being described and then automatically generating garment patterns and doing virtual garment try on.

The details and complexities of 3D measuring can be dynamic and may be dependent on the fit requirements of the garment. A sample system configuration can start with three garment style classifications: Relaxed, Casual, and Tailored. The classification could build on itself from the lowest level of fit requirement (relaxed) to the highest (tailored) wherein the measuring data becomes more detailed for garment styles that are designed to fit closer to the shape of the body. By way of reference, FIG. 5 Illustrates a fit report generated for the most basic, loosely fitting configuration (relaxed fit).

Figure 7:
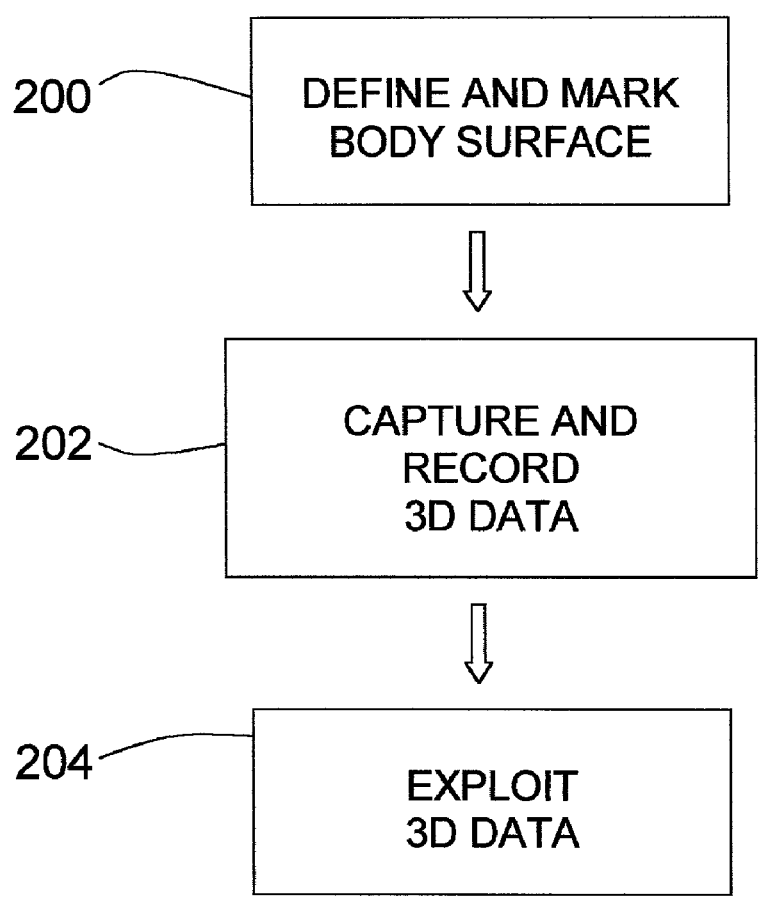
FIG. 7 is a basic diagram of the overall workflow of the present invention for a method for three-dimensional shape and size measurement.

As is shown in FIG. 7, after the procedures depicted in FIG. 1 are completed and the 3D polygonal mesh 318 has been imported into the 3D CAD design system 320, the initially performed task 200 involves defining and marking the body surface with measuring guidelines, landmarks, 3D planes, and 3D shape definition points. The next step 202 comprises capturing and recording 3D measuring data. In the final step 204, the 3D measurement data is exploited to allow, for example, the configuration of virtual mannequins, the automatic generation of garment patterns, or in a database for the accurate prediction of sizes and the virtual trying on of garments.

Figure 1A:
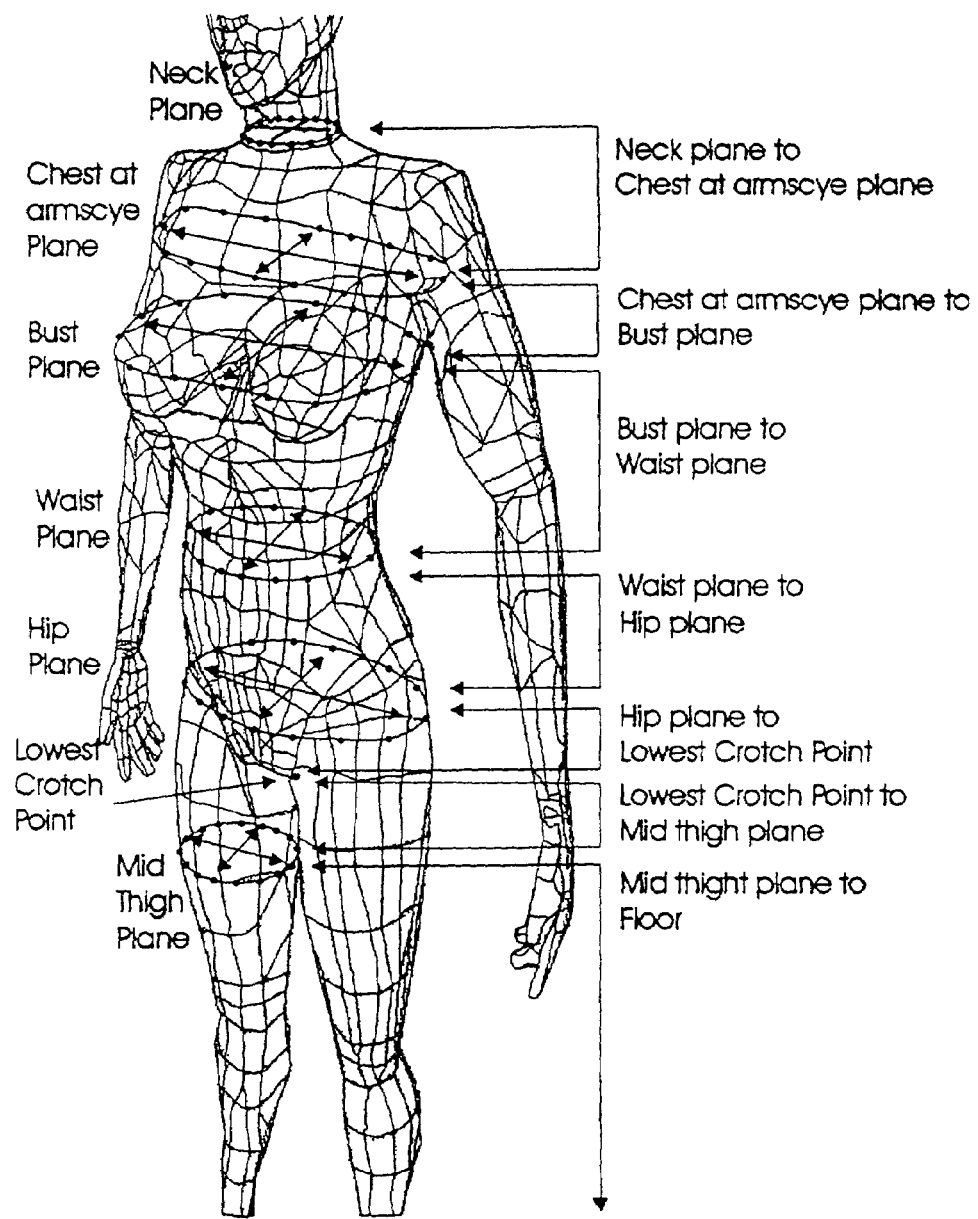
FIG. 1a is a perspective view of a human body figure illustrating 3D shape definition points created on girth measurements.

Since this invention uses 3D points placed on body measurements to describe the body shape accurately, plane definition tools are very useful for creating body cross section views by slicing the body at any desired angle. The body cross-section views are used to place 3D points on perimeters of the body surface accurately. 3D planes should be created at traditional girth measurements as is depicted in FIG. 1a. However, if desired, additional planes can be added to give more body shape details.

Figure 2A:
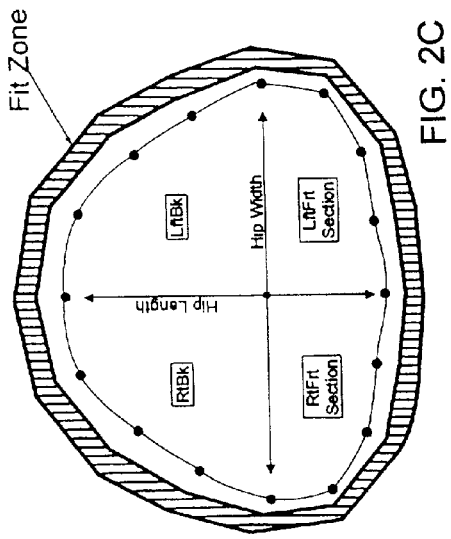
FIG. 2a is a top plan view of a body portion depicting labeled and measured cross-sectional planes.
Figure 8:
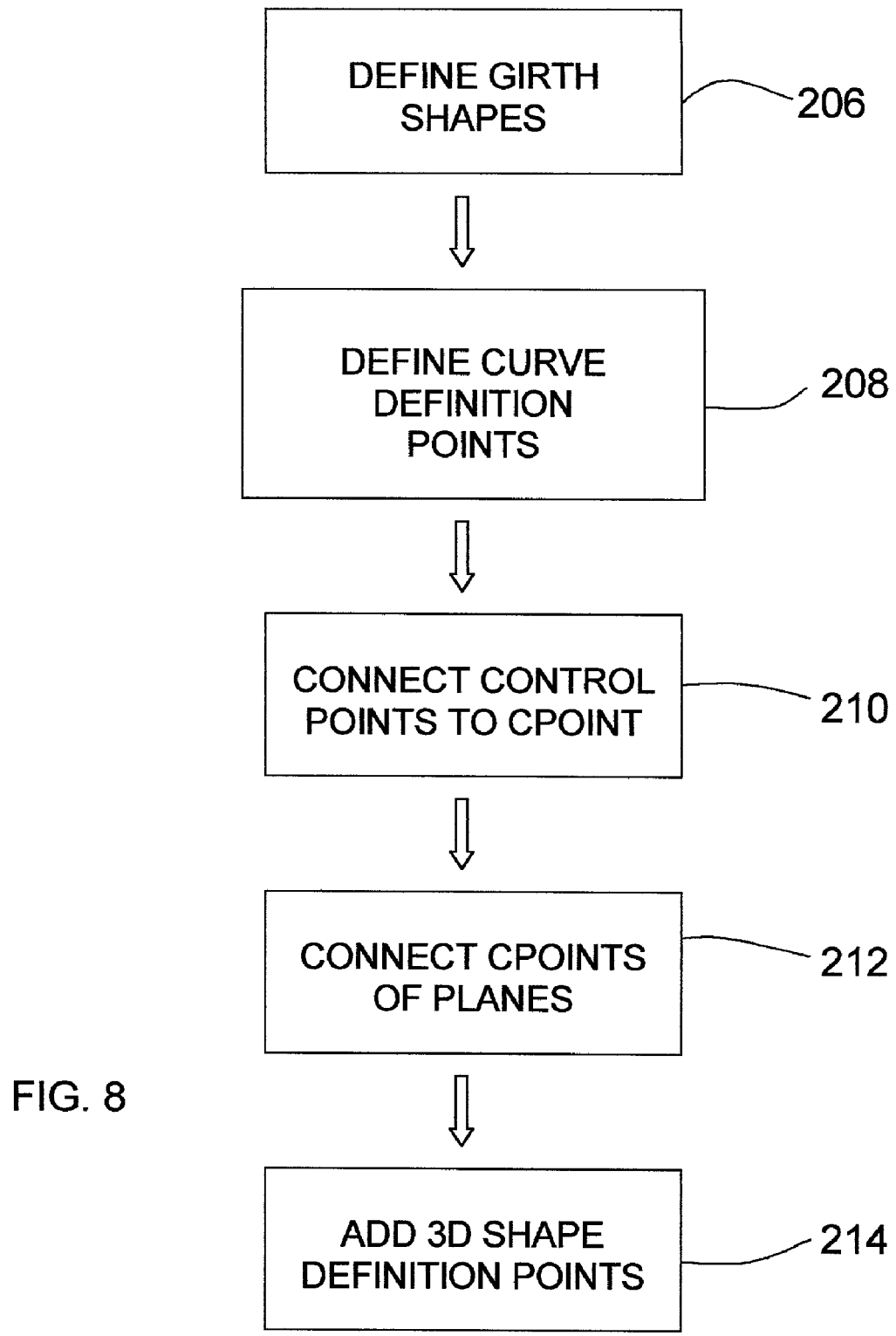
FIG. 8 is a diagram of the workflow of the present invention after body data has been imported into a 3D CAD system.

The typical workflow after body data has been imported into the 3D CAD system 320 is shown in FIG. 8. There, one sees that the workflow begins with step 206 where girth shapes are defined using horizontal planes. FIG. 2a depicts such a horizontal plane used to define a girth shape. In carrying out step 206, the first plane defined should be at the hip girth, and it should be parallel to the floor surface. As FIG. 2a shows, four extreme points will be positioned on this circumference line: one at the left side seam (labeled LftSSPoint), one at the right side seam (RtSSPoint), one at center front (CFPoint), and one at the center back (CBPoint).

As FIG. 2a also shows, a line representing the Hip Width will be drawn to connect the opposite side seam points RtSSPoint and LftSSPoint. Another line representing the Hip Length will be drawn to connect the center front and center back points CFPoint and CBPoint. The length of the Hip Width and Hip Length lines will be measured, recorded, and labeled as Y depth and X width. The angle of the two intersecting lines is also recorded. The intersection point of Y depth and X width line will be labeled as CPoint. With this, the horizontal plane has been divided into four sections. These four sections are labeled as X plane RtFrt, X plane LftFrt, X plane RtBk, X plane LftBk. In practice, "X" is replaced with the name of the respective plane, such as, for example, waist, chest, hip, and the like. Under this arrangement, the Hip CPoint can be designated as an origin point (0, 0, 0) such that it can be used as a reference for all other planes and points.

In step 208, girth plane perimeter curve definition control points, which are also shown in FIG. 2a, are defined. In this example, sixteen points are created on the girth perimeter. Three points are evenly placed between the side seam points RtSSPoint and LftSSPoint and center front and back points CFPoint and CBPoint. The three points created in each section can be labeled in a clockwise direction starting at the CFPoint1, CFPoint2, CFPoint3, then RtSSPoint1, RtSSPoint2, RtSSPoint3, and so on, respectively.

Figure 2B:
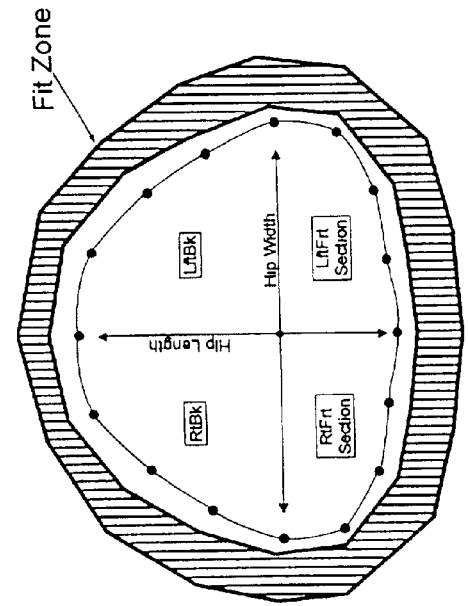
FIG. 2b is a top plan view of a body portion depicting additional labeled and measured cross-sectional planes.

Step 210, the results of which are shown in FIG. 2b, comprises drawing straight lines between all curve definition control points on the horizontal plane and the Cpoint. The length of each of the drawn straight line is recorded. Furthermore, using the line connecting the CPoint and the LftSSPoint as a reference line, the angle between each drawn straight line and the reference line is recorded. With this, this information can be used to recreate the shape of the horizontal plane.

Figure 1B:
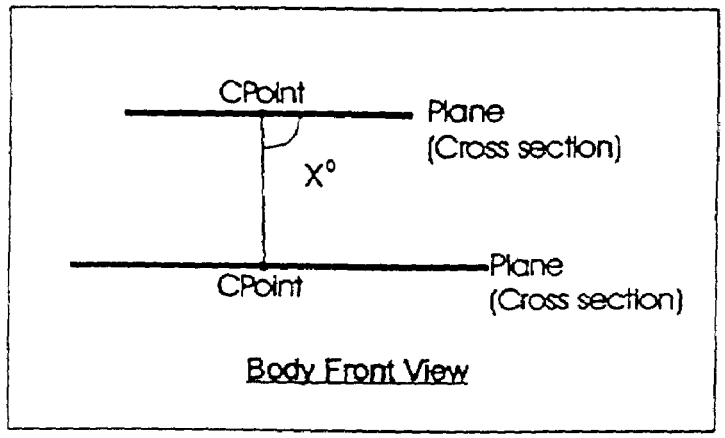
FIG. 1b is a schematic view in front elevation of a body portion illustrating a line drawn between planes for calculating plane positioning.
Figure 1C:
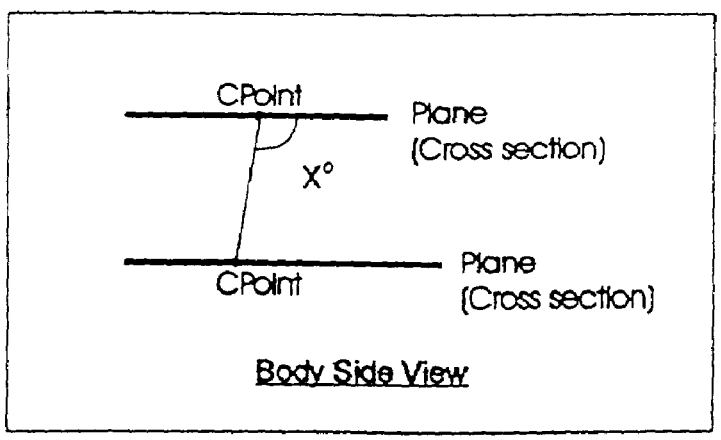
FIG. 1c is a schematic view in side elevation of a body portion illustrating a line drawn between planes for further calculating plane positioning.

After all necessary or desired planes are created, step 212 is performed where straight lines are drawn to connect the CPoints of adjacent planes. The results of step 212 are shown in FIGS. 1b and 1c. From FIG. 1b, one sees that, in this exemplary body, the CPoints are generally aligned when viewed from the front. However, as FIG. 1c shows, when viewed from the side, the CPoints are laterally displaced relative to one another by a relatively significant amount. With this, the lengths of the lines and their angles relative to, for example, the horizontal plane can be recorded to enable plane-positioning reference.

The next step, labeled as step 214 in FIG. 8, comprises identifying and defining measurement guidelines and landmarks by adding 3D shape definition points to certain measurements. The results of step 214 are depicted in FIGS. 3a–3d. There, one sees that the 3D shape definition points can be added to girth measurements, arc measurements, vertical measurements (typically taken with shoes on), and width and length measurements.

A plurality of potential girth measurements are labeled in FIGS. 3a–3d with reference numbers 1–19 and are described more particularly hereinafter. Bust/chest girth 1—level of maximum bust girth. Waist girth 2—average waist level. Hip girth 3—average hip level. Abdominal extension 4—level of extension. Chest girth at scye 5—minimal chest girth level. Thigh 6—maximum at upper part of leg. Mid-Thigh 7—midway between hip and knee. Knee girth 8—around the leg and over the kneecap. Calf girth 9—around the leg and over the kneecap. Ankle girth 10—at the level of maximum girth. Neck girth 11—at midway level. Neck base 12—at base of neck. Upper arm 13—girth at armhole base level. Elbow girth 14—measured with the arm bent at a right angle. Wrist girth 15—measured over the distal end of the ulna. Head circumference 16—at maximum girth level. Sitting spread 17—measured around both thighs of seated subject. Vertical trunk 18—mid-shoulder point to crotch. Armhold girth 19—from the shoulder point through the underarm.

Figure 3A:
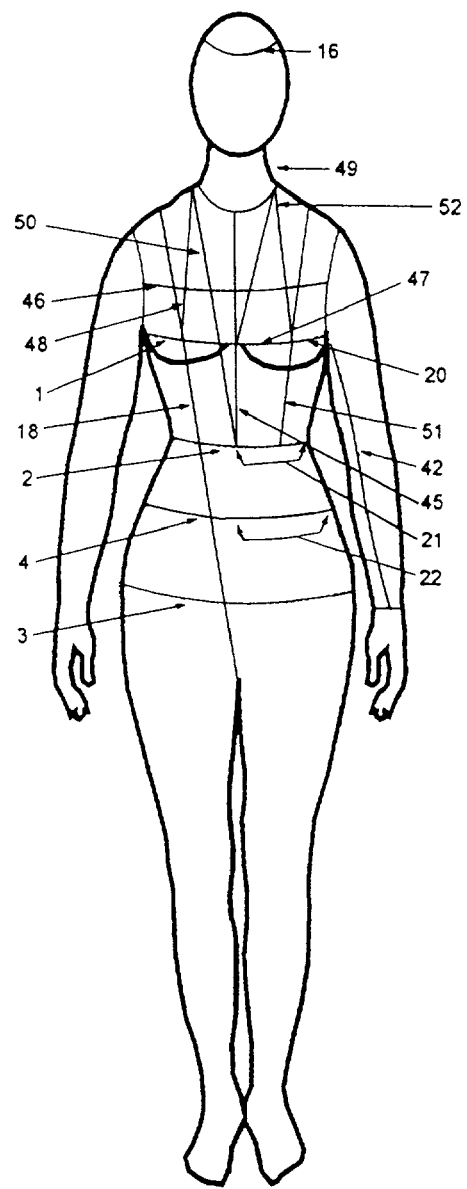
FIG. 3a is a view in front elevation of a human body figure depicting detailed diagrams of measurement guidelines and landmarks.

Some possible arc measurements, bearing reference numbers 20–23, also are depicted in FIG. 3a. Those arc measurements are as follows: bust arc anterior 20—front portion of the bust girth; waist arc anterior 21—front portion of the waist girth; abdominal extension arc anterior 22—front portion of abdominal extension girth; and hip arc posterior 23—back portion of hip girth.

FIG. 3 depicts possible vertical measurements 24–34. These measurements 24–34 can be described as follows: height 24—from peak of head to soles of feet (taken without shoes on); cervical height 25—from cervical to floor; waist height 26—waist level to floor; abdominal extension 27—from extension level to floor; hip height 28—hip level to floor; knee height 29—knee to feet; ankle height 30—ankle to floor; side seam 31—waist level at side to floor; body rise 32—at side form waist level to level of the seat with the subject sitting; inside leg 33—base of the trunk to soles; and sitting spread height 34—average height of the most lateral extension of the upper thighs when the subject is standing.

Figure 3B:
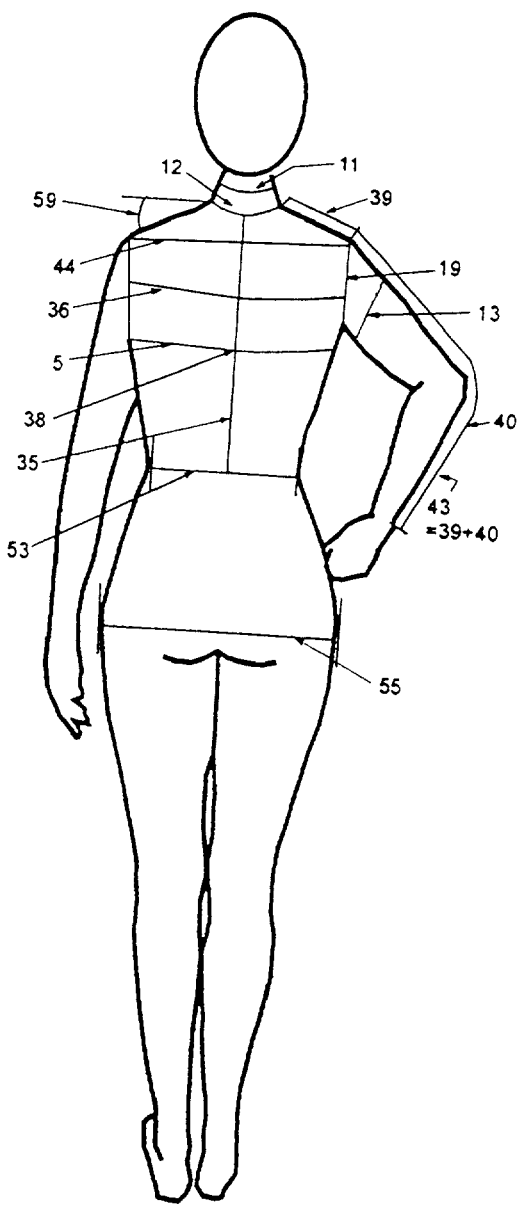
FIG. 3b is a view in rear elevation of a human body figure depicting further detailed diagrams of measurement guidelines and landmarks.
Figures 3C, 3D:
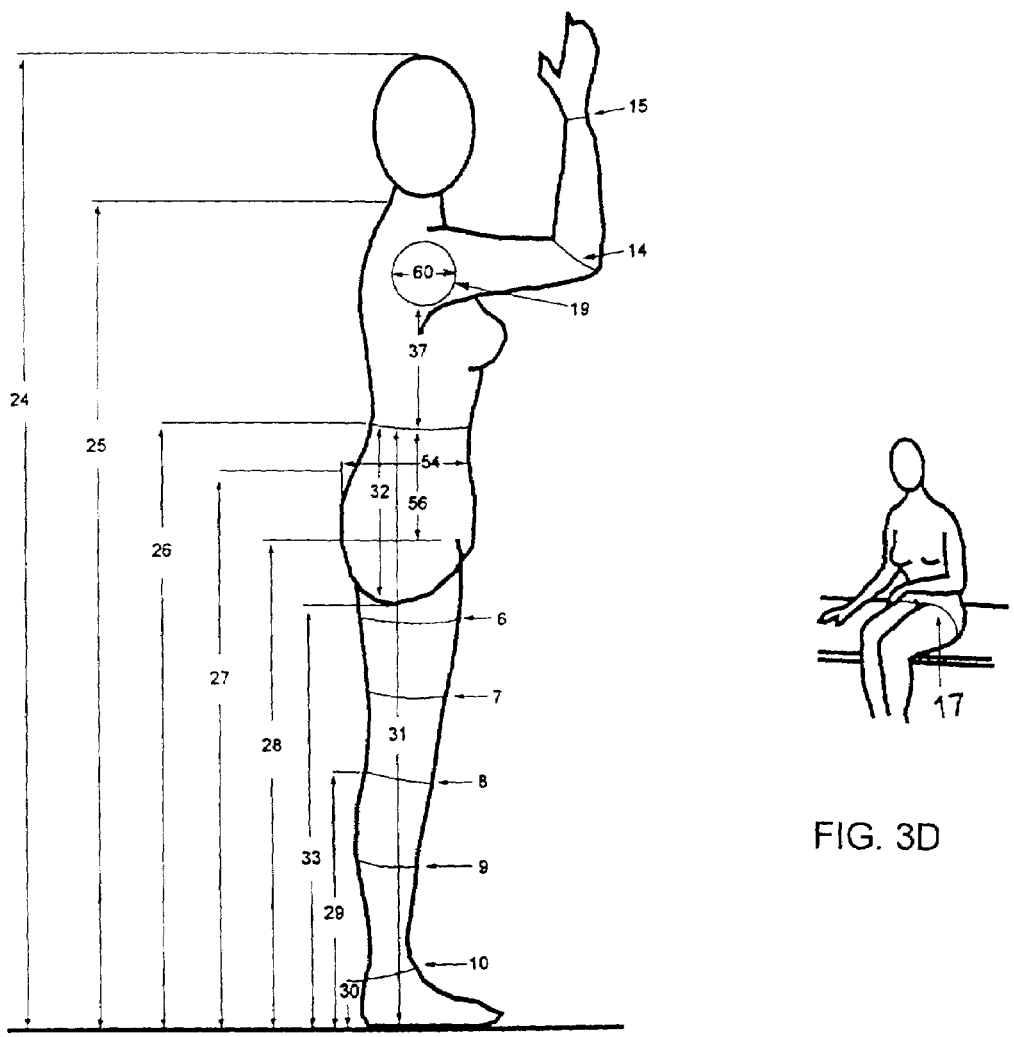
FIG. 3c is a view in side elevation of a human body figure depicting detailed still further diagrams of measurement guidelines and landmarks.
FIG. 3d is a perspective view of a seated human body figure depicting another detailed diagram of measurement guidelines and landmarks.

Even further still, FIGS. 3a–3c depict possible width and length measurements with reference numbers 35–60. These width and length measurements can be described more particularly as follows: waist length, back 35—cervical to waist length; across back 36—between posterior armscyes; armscye to waist 37—underarm mid-point to waist at side; scye depth 38—cervical to a point level with the mid-underarm point; shoulder length 39—intersections of shoulder line with neck base and armscye; arm length 40—from intersection of shoulder and armscye lines, over the elbow to the wrist; upper arm length 41—same as arm length 40, but taken to elbow; underarm length 42—underarm mid-point to wrist line; neck point to wrist 43—from neck base on shoulder line to wrist; interacromion width 44—between acromion points; waist length, front 45—from neck base to waist level at center front; across chest 46—front of the chest from armscye to armscye, midway between shoulder and armhole base (same level as across back 36); width of bust prominence 47—from bust point to bust point; neck to bust point 48—from front shoulder point to bust point; cervical to center front waist 49—from cervical to waist level at center front; neck point to front waist 50—from neck point over bust to front waist (vertically); center shoulder to front waist 51—from shoulder line to bust point and then vertically to waist line; cervical to bust point 52—from cervical to bust point; lateral waist width 53—width of body at waist level; abdomen seat diameter 54—greatest depth of body from abdomen to seat; bitrochanteric width 55—width of body at hip level; waist to hip 56—waist line to hip line at side; crotch length 57—center front waist, through crotch to center back waist; crotch length, front 58—front portion of crotch length 57 to center of inner thigh at crotch level; shoulder slope 59—slope in relation to horizontal; scye width 60—depth between anterior and posterior armscyes.

After all the planes, shape definition points, measurement lines, and landmarks have been established, the measurement collection process can be carried out in an interactive or automated manner. The results can be used, for example, as shape adjustment parameters of virtual mannequins. They also can be used in 3D CAD systems to make automatic 3D and 2D custom garments patterns or regular stock garment patterns.

Figure 4:
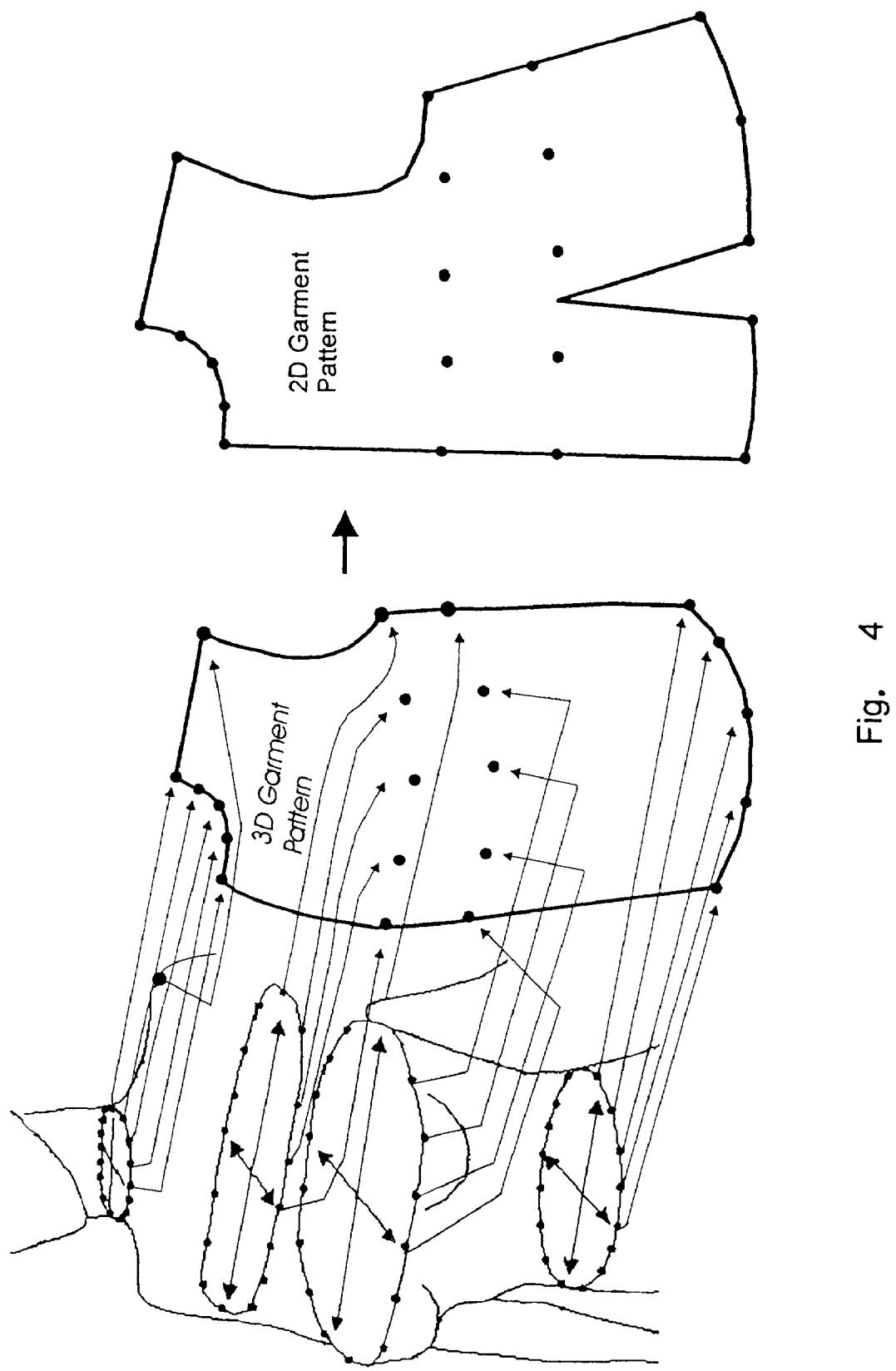
FIG. 4 is a perspective view of a portion of a human body and 3D and 2D garment patterns demonstrating how 3D shape definition points are used in building 3D garment patterns and how the 3D garment patterns can be converted to flattened 2D patterns.

As is shown in FIG. 4, the 3D pattern making process can begin with creating garment patterns on top of the virtual mannequin. To do so, the body shape control points can be used as references to create new reference points that are spaced away from the body surface. 3D curve lines can be created using these points. The 3D curve lines can then be joined together to form the perimeters of 3D garment pattern pieces. The 3D space between the garment pattern and the body surface can be further defined using additional points and curves. If relational geometry technology is utilized by the CAD system, then automatic custom-made garments, which may be termed 'intelligent patterns' or 'magic garments,' can be created.

Figure 9:
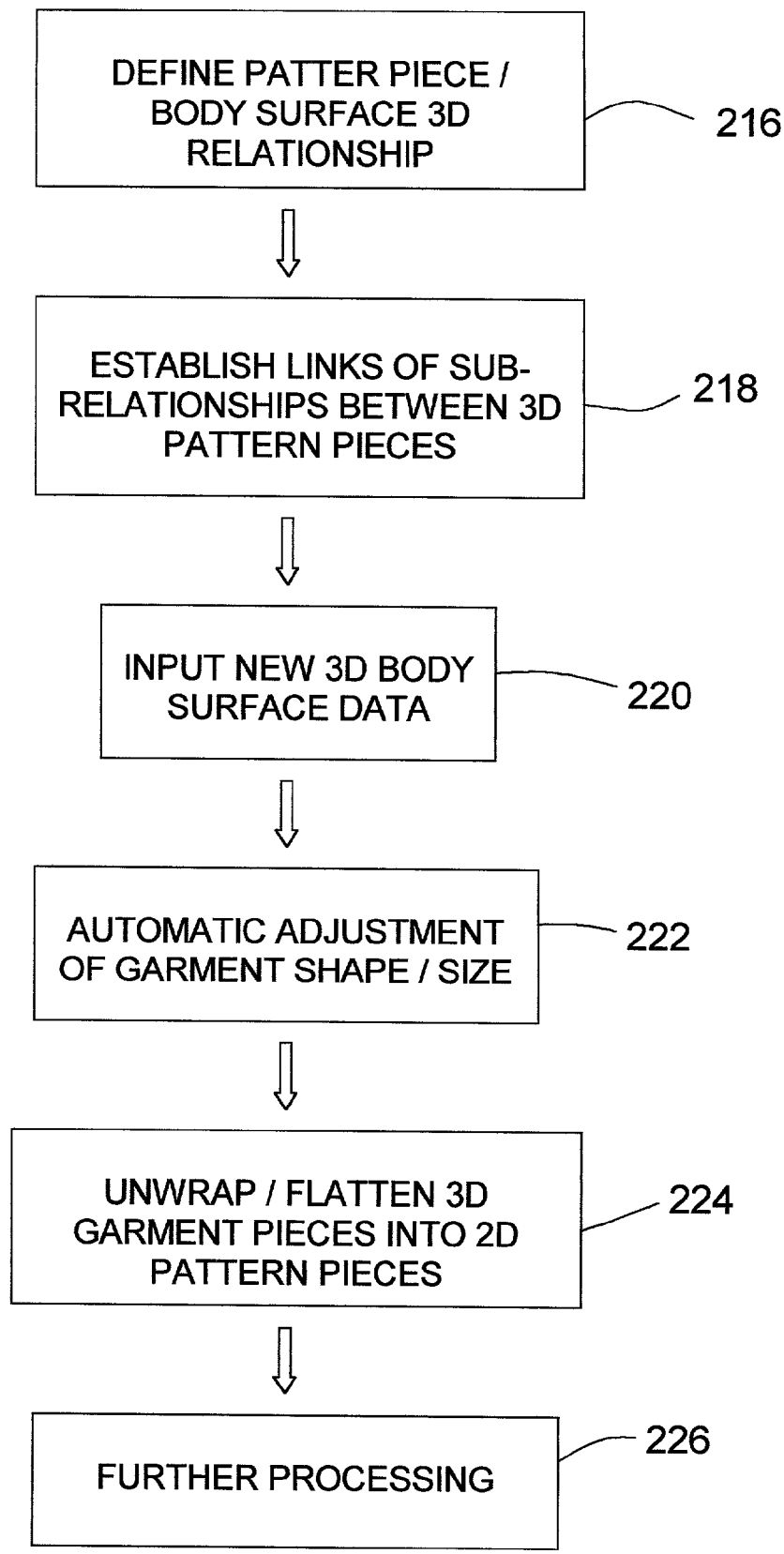
FIG. 9 is a diagram of the workflow of the present invention during the automatic creation of a custom-made garment.

Looking to FIG. 9, one sees that the steps in creating a 'magic garment,' a garment that is automatically custom made, begin with step 216 where the relationships between the pattern pieces and the body surfaces are defined in 3D. Next, links of sub-relationships between all 3D pattern pieces in a given style are established under step 218. With the relationships sub-relationships between the pattern pieces and the relationships between the pattern pieces and the body surfaces defined, new 3D body surfaces with different dimensions and shapes can be input under step 220, and the system can undertake step 222 wherein the 'magic garment' will adjust its shape and size automatically (with all linked pattern pieces) to the new 3D body surfaces. Advantageously, the garment will maintain all pre-defined geometric relationships between the pattern pieces and the body surfaces and the sub-relationships between the pattern pieces themselves. The custom made 3D garment can then be automatically 'unwrapped/flattened' into 2D pattern pieces under step 224. With this, the 2D pattern pieces can be further processed under step 226. The further processing of step 226 could take a number of forms including, for example, sending the information defining the 2D pattern pieces on to a computerized fabric cutter so that the 2D pattern pieces can be cut from, for example, a bolt of fabric or the like.

Figure 10:
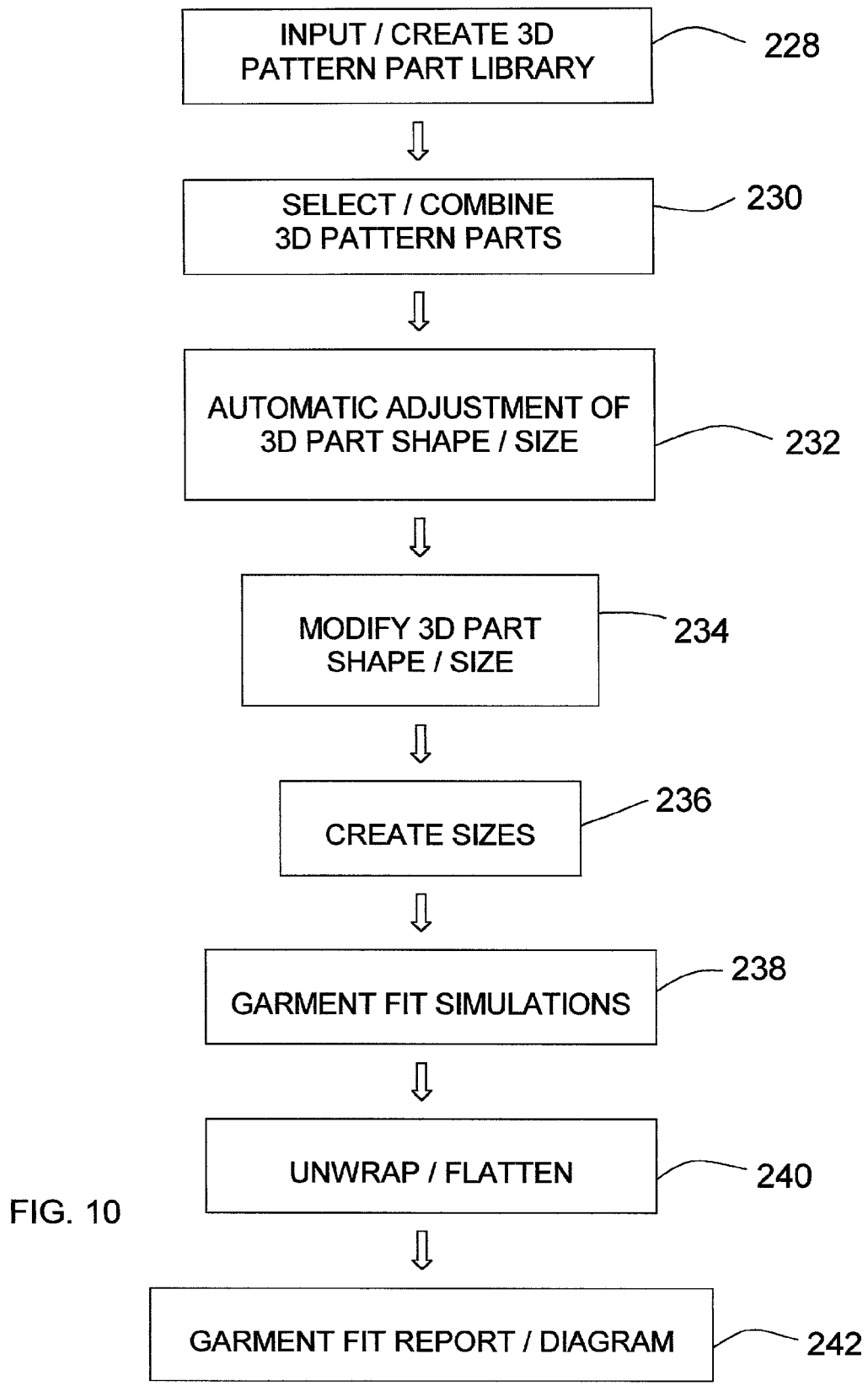
FIG. 10 is a diagram of the workflow of the present invention during the creation of standard, stock-sized garments.

One possible embodiment of the system can also employ 3D relational geometry for automatic pattern making relative to standard, stock-sized garments under the process generally shown in FIG. 10. The system also is able to check for best fit and size prediction. Under this arrangement, a library of intelligent 3D pattern parts can first be input into the system or created within the system under step 228. The library, of course, could include any possible 3D pattern part including, by way of example only, different styles of collars, sleeves, pockets, bodices and any one of the many other 3D pattern parts that would readily occur to one skilled in the art. With such a library provided, 3D parts can be selected and combined under step 230 to create different combinations and new designs on, for example, a standard-sized virtual mannequin. Under step 232, the system can automatically adjust the shape and size of the selected and combined 3D parts to accommodate the shape and size of the virtual mannequin and one another and to ensure that they fit together properly.

If desired, the user can then undertake step 234, the selective modification of the shape and, possibly, the size of one or more of the 3D parts. With this, modifications can be carried out in a virtual manner such that unique new looks can be created with speed, relative ease, and without waste. Once the virtual garment is so created, the system can automatically carry out step 236 where the virtual garment is graded into different 3D sizes by the adjustment of the shape and size of the virtual mannequin and then extracting patterns from it.

Figure 2C:
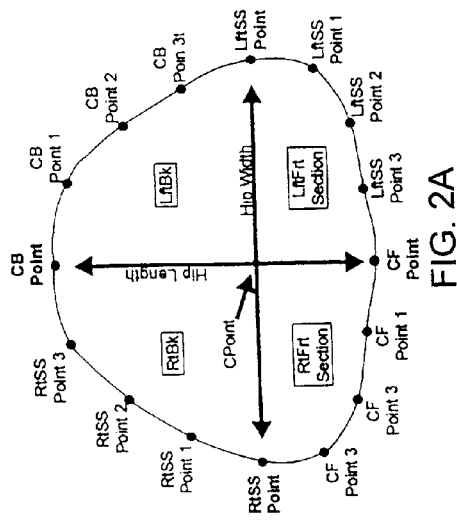
FIG. 2c is a top plan view of a body portion and a garment depicting the fit zone for a close fitting garment.
Figure 2D:
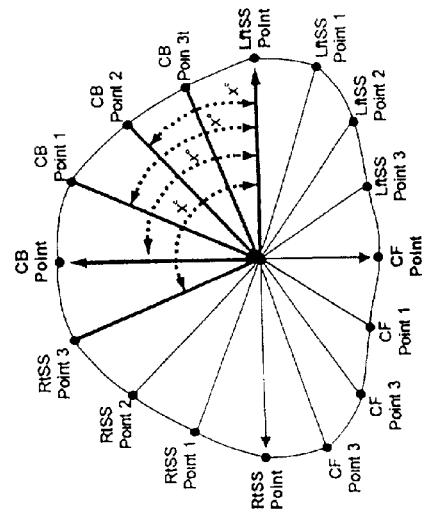
FIG. 2d is a top plan view of a body portion and a garment depicting the fit zone for a loose fitting garment thereby depicting the difference between it and the close fitting garment of FIG. 2C.

Next, garment fit simulations can be performed on each size under step 238 to check how the garment will look when worn by bodies of various shapes. The simulation program can be taught to understand the proper fit characteristics of each given garment. As the garment is run though the simulation tests, all different fit data combinations that fall with in the 'proper fit' characteristics will be recorded. Fit zones will be established for each plane as is shown in FIGS. 2c and 2d. Loose fitting styles as in FIG. 2d will have a wider fit zone than a tight fitting style garment as in FIG. 2c. The illustration shows the body cross section being examined does not fall within the fit zone, which means the garment is too big and will not fit the person properly such that it must be appropriately modified.

Once the garment is properly sized, each size of the garment can then be unwrapped automatically and flattened into new 2D patterns. As FIG. 5 shows, a garment fit report can be generated under step 242 for any given style and for any customer to describe how the garment will fit a given user in a given size. Under step 242, a fit zone diagram can also be printed out individually to show how a garment will fit in relation to the body.

It will be clear that the present invention has been shown and described with reference to certain preferred embodiments that merely exemplify the broader invention revealed herein. Certainly those skilled in the art can conceive of alternative embodiments. For instance, those with the major features of the invention in mind could craft embodiments that incorporate those major features while not incorporating all of the features included in the preferred embodiments.

With the foregoing in mind, the following claims are intended to define the scope of protection to be afforded the inventor. The claims shall be deemed to include equivalent constructions insofar as they do not depart from the spirit and scope of the invention. A plurality of the following claims express certain elements as means for performing a specific function, at times without the recital of structure or material. As the law demands, these claims shall be construed to cover not only the corresponding structure and material expressly described in this specification but also equivalents thereof.

I claim as deserving the protection of United States Letters Patent:

1. A method for three-dimensional shape and size measurement of a three-dimensional body surface comprising the steps of:
   providing a three-dimensional scanner; providing a processor;
   providing a three-dimensional Computer Aided Design system;
   scanning in three dimensions with the three-dimensional scanner at least a portion of the three-dimensional body surface;
   creating a data file representative of the three-dimensional body surface;
   processing the data file with the processor;
   importing the data file into the three-dimensional Computer Aided Design System;
   employing the three-dimensional Computer Aided Design System relative to the data file to define and record three-dimensional measuring data relative to at least a portion of the three-dimensional body surface comprising adding three-dimensional shape definition points to the three-dimensional body surface for identifying and defining measurement guidelines and landmarks; and
   employing the three-dimensional Computer Aided Design System to exploit the three-dimensional measuring data comprising employing the three-dimensional Computer Aided Design System to create garment patterns comprising creating reference points that are spaced from the three-dimensional shape definition points on the three-dimensional body surface, creating three-dimensional curve lines using the reference points, and forming three-dimensional garment pattern pieces using the three-dimensional curve lines and comprising creating automatic custom-made garment patterns by employing pre-selected spatial relationships between the three-dimensional garment pattern pieces and the three-dimensional shape definition points to adjust locations of the reference points automatically to maintain the pre-selected spatial relationships in response to changes in locations of the three-dimensional shape definition points.

2. The method of claim 1 wherein the step of processing the data file with the processor comprises aligning captured 3D XYZ point cloud data sets, patching areas with missing 3D XYZ point cloud data, and filtering and deleting noisy data.

3. The method of claim 2 wherein the step of processing the data file with the processor further comprises merging the data to create a polygonal mesh of the three-dimensional body surface.

4. The method of claim 1 wherein the steps of creating a data file representative of the three-dimensional body surface and processing the data file with the processor are dependent in detail on fit requirements of a garment.

5. The method of claim 4 wherein the fit requirements of the garment comprise a loose fit requirement and a tailored fit requirement.

6. The method of claim 1 wherein the step of employing the three-dimensional Computer Aided Design System relative to the data file to define and record three-dimensional measuring data relative to at least a portion of the three-dimensional body surface comprises defining at least one girth shape with a planar section of the three-dimensional body surface.

7. The method of claim 6 wherein the step of defining at least one girth shape with a planar section comprises defining a plurality of girth shapes with planar sections of the three-dimensional body surface.

8. The method of claim 7 wherein the step of defining at least one girth shape with a planar section further comprises determining a center point of each of at least some of the plurality of girth shapes.

9. The method of claim 1 further comprising defining a plurality of girth plane perimeter curve definition control points along a perimeter of the girth plane between the opposing extreme points of the girth shape, determining a distance between each of the plurality of girth plane perimeter curve definition control points and the center point, and determining an angular orientation of a line between each of the plurality of girth plane perimeter curve definition control points and the center point whereby the girth shape can be recreated.

10. The method of claim 9 further comprising determining a relative location of a center point of a first girth shape relative to a center point of a second girth shape.

11. The method of claim 10 wherein the step of determining the relative location of the center point of the first girth shape relative to the center point of the second girth shape comprises determining a distance between the center points of the first and second girth shapes and determining an angular orientation of a line connecting the first and second girth shapes whereby relative locations of the first and second girth shapes can be recreated.

12. The method of claim 9 wherein the step of defining a plurality of girth shapes with planar sections of the three-dimensional body surface includes defining a hip girth whereby the hip girth can be used as a reference plane.

13. The method of claim 1 wherein the step of employing the three-dimensional Computer Aided Design System to create garment patterns further comprises unwrapping/flattening the three-dimensional garment pattern pieces into two-dimensional garment pattern pieces.

14. The method of claim 13 further comprising sending information regarding the 2D pattern pieces to a fabric cutter.

15. A method for employing 3D relational geometry for automatic pattern making comprising the steps of:
providing a three-dimensional Computer Aided Design system;
providing a data file representative of a three-dimensional body surface;
providing a library of three-dimensional pattern parts;
importing the data file and the library of three-dimensional pattern parts into three-dimensional Computer Aided Design system;
employing the three-dimensional Computer Aided Design System relative to the data file and the library of three-dimensional pattern parts to define and record three-dimensional measuring data relative to at least a portion of the three-dimensional body surface and the library of three-dimensional pattern parts comprising adding three-dimensional shape definition points to the three-dimensional body surface and the library of three-dimensional pattern parts for identifying and defining measurement guidelines and landmarks; and
employing the three-dimensional Computer Aided Design System to create a three-dimensional pattern from the three-dimensional measuring data and the library of three-dimensional pattern parts comprising employing pre-selected spatial relationships between the three-dimensional body surface and the library of three-dimensional parts to maintain the pre-selected special relationships in response to changes in a shape and size of the three-dimensional body surface and in response to changes in a shape and size of elements of the library of three-dimensional pattern parts.

16. The method of claim 15 further comprising unwrapping/flattening the three-dimensional pattern into two-dimensional patterns.

17. The method of claim 16 further comprising sending information regarding the 2D pattern pieces to a fabric cutter.

18. The method of claim 15 further comprising establishing fit zones between the three-dimensional body surface and the three-dimensional pattern.

19. The method of claim 18 further comprising providing a depiction of the fit zones.

20. The method of claim 15 wherein the step of employing the three-dimensional Computer Aided Design System relative to the data file and the library of three-dimensional pattern parts to define and record three-dimensional measuring data relative to at least a portion of the three-dimensional body surface and the library of three-dimensional pattern parts comprises defining at least one girth shape with a planar section of the three-dimensional body surface.

21. The method of claim 20 wherein the step of defining at least one girth shape with a planar section comprises defining a plurality of girth shapes with planar sections of the three-dimensional body surface.

22. The method of claim 21 wherein the step of defining at least one girth shape with a planar section further comprises determining a center point of each of at least some of the plurality of girth shapes.

* * * * *